Patented Nov. 2, 1943

2,333,394

UNITED STATES PATENT OFFICE 2,333,394

HALOGEN ACYL DERIVATIVES OF 4,4'-DI-AMINODIPHENYL SULPHONE

Horace A. Shonle and Arthur M. Van Arendonk, Indianapolis, Ind., assignors to Eli Lilly and Company, Indianapolis, Ind., a corporation of Indiana No Drawing. Original application December 1, 1941, Serial No. 421,238. Divided and this application October 31, 1942, Serial No. 464,146

4 Claims. (Cl. 260—397.6)

This application is a continuation in part of applicants' copending application, Serial No. 361,585, filed October 17, 1940; and is a division of applicants' co-pending application Serial No. 421,238, filed December 1, 1941, now Patent No. 2,323,573, granted July 6, 1943.

This invention relates to halogen acyl derivatives of chemotherapeutic agents and processes of preparing them.

Many of the compounds of this invention are particularly efficacious in combating streptococcal infections. For example, a dose of 4,4'-di(trichloroacetylamino)diphenyl sulphone is at least as effective as 4,4'-diaminodiphenyl sulphone when administered orally or intraperitoneally to white mice in combating streptococcic infections. In addition, the compounds of this invention are markedly less toxic than the parent substances from which they are derived.

The compositions of this invention may be represented by the following formula:

(1) 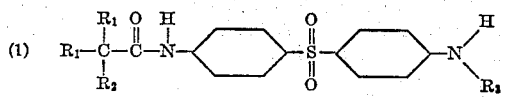

in which $R_1$ is a halogen selected from the class consisting of chlorine and bromine; $R_2$ is a member of the class consisting of chlorine, bromine, and hydrogen; and $R_3$ is a member of the class of acetyl, propionyl, and butyryl.

Throughout the description of this invention $R_1$, $R_2$, and $R_3$ have the same meaning as heretofore defined. The substituents $R_1$, $R_1$ in Formulas 1 and 2 represent identical halogens.

The compositions of this invention are prepared by the following method:

One molecular equivalent of a substituted acetyl halide having the following formula:

(2) 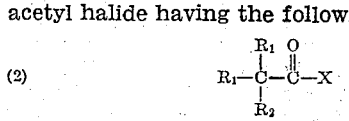

in which X represents chlorine or bromine, is reacted with one or preferably two molecular equivalents of a 4-amino-4'-$R_4$-amino-diphenyl sulphone, having the following formula:

(3) 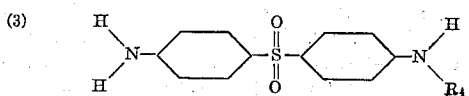

in which $R_4$ is a member of the class consisting of acetyl, propionyl and butyryl.

The 4-amino-4'-$R_4$-aminodiphenyl sulphone is dissolved or suspended in a suitable solvent, preferably miscible with water, such as dioxane, and the substituted acetyl chloride is added to the solution or suspension. Other solvents which are not miscible with water, such as ethyl acetate, may be used. The mixture is agitated, as by means of stirring, and permitted to stand for approximately one hour, within which time the reaction is completed and the desired compound formed. An excess of water is then added together with sufficient mineral acid, such as hydrochloric acid, to help keep in solution the unreacted or unacylated 4-amino-4'-$R_4$-aminodiphenyl sulphone. The resulting suspension is cooled until the bulk of the newly prepared material has solidified. The desired product is separated from the supernatant liquid by any suitable means, such as filtration. This precipitate may be purified by recrystallization from a solvent, such as methyl alcohol, dioxane, or glacial acetic acid. The reaction which takes place may be represented by the following equation:

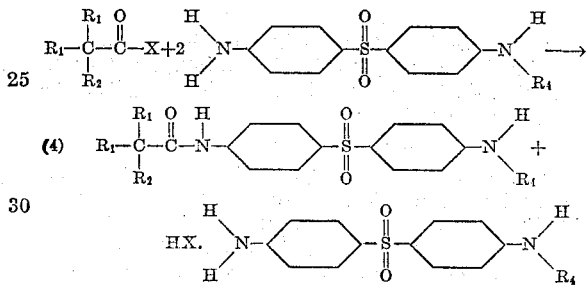

It is observed that the one molecular equivalent of the amino base acts to neutralize the hydrohalogen acid which is formed. The amino base is soluble in acid, whereas the halogen acyl derivative is relatively insoluble in acid. For this reason, it is desirable to add a small quantity of a mineral acid, such as hydrochloric acid, to the reaction mixture after the reaction has been completed and the mixture has been diluted in solution in order to retain the unreacted or unacylated 4-amino-4'-$R_4$-aminodiphenyl sulphone in solution.

In certain cases, instead of using two molecular equivalents of the 4-amino-4'-$R_4$-aminodiphenyl sulphone, one molecular equivalent of the 4-amino-4'-$R_4$-aminodiphenyl sulphone and another base, such as pyridine, sodium carbonate or sodium bicarbonate, may be employed. In using an inorganic base, such as sodium bicarbonate, which is substantially insoluble in the organic solvents employed, an aqueous phase is required for the efficient practice of the method.

Some examples of the preparation of derivatives of this invention are as follows:

EXAMPLE 1.—*The preparation of 4-tribromoacetyl-amino-4'-acetylaminodiphenyl sulphone*

5.8 g. (about 0.02 mol) of 4-amino-4'-acetylamino-diphenyl sulphone are dissolved in about 100 cc. of dioxane and to this solution are added, with stirring 3.6 g. (about 0.01 mol) of tribromoacetyl bromide. The mixture is agitated for a period of fifteen minutes and is allowed to stand at room temperature for about one hour within which time 4-tribromoacetylamino-4'-acetyl-aminodiphenyl sulphone is produced. The mixture is then diluted with about 300 cc. of water, to which about 30 cc. of concentrated hydrochloric acid (sp. gr. 1.2) are added. The 4-tribromoacetyl-4'-amino-diphenyl sulphone separates out as an oil or crystalline solid. To secure a larger yield and facilitate crystallization, the mixture is chilled to less than 10° C. for about two or three hours. The solid precipitate is filtered off. To purify the product, the precipitate is dissolved in boiling dioxane or other suitable solvent. The hot solution is diluted slightly with water to incipient precipitation and is cooled. The solid material which separates is 4-tribromoacetylamino - 4' - acetylaminodiphenyl sulphone which melts at about 254°–255° C., uncorrected. The reaction which takes place may be represented by the following equation:

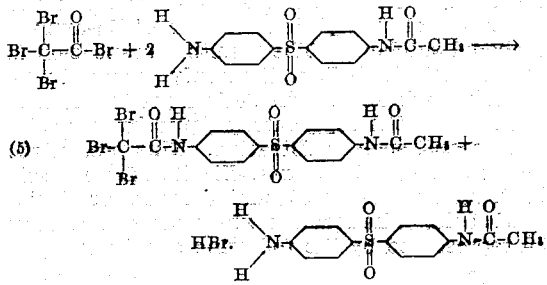

EXAMPLE 2.—*The preparation of 4-tribromoacetylamino-4'-propionylaminodiphenyl sulphone and 4-tribromoacetylamino-4'-butyrylaminodiphenyl sulphone*

Instead of using 4-amino-4'-acetylaminodiphenyl sulphone, as outlined in Example 1, an equivalent amount of 4-amino-4'-propionylaminodiphenyl sulphone or 4-amino-4'-butyrylaminodiphenyl sulphone may be used to produce respectively 4-tribromoacetylamino - 4'-propionylaminodiphenyl sulphone or 4-tribromoacetylamino-4'-butyrylaminodiphenyl sulphone.

The 4-amino-4'-propionylaminodiphenyl sulphone employed to prepare 4-tribromoacetylamino-4'-propionylaminodiphenyl sulphone is a new compound and is prepared as follows:

To 25 g. (about 0.1 mol) of 4,4'-diaminodiphenyl sulphone dissolved in 200 cc. of boiling dioxane are added 13 g. (about 0.1 mol) of propionic anhydride. The solution is boiled for several minutes, during which time the desired product is formed, and then allowed to cool to room temperature. The solution is then poured into 1.5 liters of water containing 150 cc. of concentrated hydrochloric acid (sp. gr. 1.2) and is then allowed to stand for one hour, after which time the insoluble 4,4'-dipropionylaminodiphenyl sulphone is removed by filtration. The filtrate is partially neutralized with ammonium hydroxide solution until a slight cloudiness appears. It is then chilled to below 5° C. for preferably not less than eight hours. The precipitate which forms consists of the desired 4-amino-4'-propionylaminodiphenyl sulphone with some unchanged 4,4'-diaminodiphenyl sulphone. This precipitate is dissolved in a minimum amount of boiling methyl alcohol and then cooled to preferably slightly below 0° C. The precipitate is filtered off and recrystallized once or twice from methyl alcohol. The 4-amino-4'-propionylaminodiphenyl sulphone melts at about 200°–201° C., uncorrected, and may be represented by the following formula:

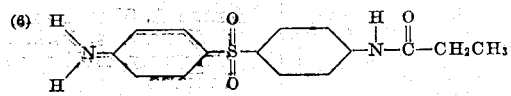

The 4-amino-4'-butyrylaminodiphenyl sulphone is also a new compound and is prepared in the same manner as the 4-amino-4'-propionylaminodiphenyl sulphone using 25 g. (about 0.1 mol) of 4,4'-diaminodiphenyl sulphone and 15.8 g. (about 0.1 mol) of butyric anhydride. The desired 4-amino-4'-butyrylaminodiphenyl sulphone melts at about 192°–193° C., uncorrected.

EXAMPLE 3.—*The preparation of 4-trichloroacetylamino-4'-acetylaminodiphenyl sulphone*

Instead of using tribromoacetyl bromide, as outlined in Example 1, an equivalent amount of trichloroacetyl chloride may be used to produce 4-trichloroacetylamino - 4'- acetylaminodiphenyl sulphone. The 4-trichloroacetylamino-4'-acetylaminodiphenyl sulphone has a melting point of about 268°–269° C., uncorrected, and may be represented by the following formula:

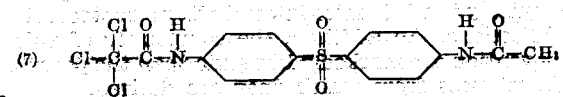

EXAMPLE 4.—*The preparation of 4-trichloroacetylamino - 4' - propionylaminodiphenyl sulphone and 4-trichloroacetylamino-4'-butyrylaminodiphenyl sulphone*

Instead of using 4-amino-4'-acetylaminodiphenyl sulphone, as outlined in Example 1, an equivalent amount of 4-amino-4'-propionylaminodiphenylsulphone and 4-amino-4'-butyrylamino-diphenyl sulphone is reacted with the required amount of trichloroacetyl chloride to produce respectively 4-trichloroacetylamino-4'-propionyl-aminodiphenyl sulphone and 4-trichloroacetylamino-4'-butyrylaminodiphenyl sulphone.

EXAMPLE 5.—*The preparation of dibromoacetylamino-4'-acetylaminodiphenyl sulphone*

5.8 g. (about 0.02 mols) of 4-amino-4'-acetylaminodiphenyl sulphone are dissolved in about 100 cc. of dioxane and to this solution are added with stirring 2.8 g. (about 0.01 mol) of dibromoacetyl bromide. The mixture is agitated for a period of 15 minutes and is allowed to stand at room temperature for about one hour, within which time 4 - dibromoacetylamino - 4'-acetylaminodiphenyl sulphone is produced. The mixture is then diluted with about 100 cc. of water to which about 30 cc. of concentrated hydrochloric acid (sp. gr. 1.2) are added. The dibromoacetyl-4-aminodiphenyl sulphone separates out as an oil or crystalline solid. To secure a larger yield and facilitate crystallization, the mixture is chilled to less than 10° C. for about two or three hours. The solid precipitate is filtered off. To purify the product, the precipitate is dissolved in boiling dioxane or other suitable solvent. The hot solution is diluted slightly with water to incipient precipitation and is cooled. The solid material which separates is 4-dibromoacetylamino - 4' - acetylaminodiphenyl sulphone and is represented by the following:

(8) 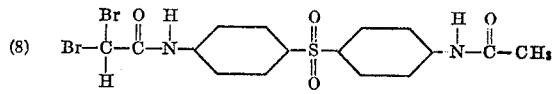

EXAMPLE 6.—*The preparation of 4-dibromoacetylamino-4'- propionylaminodiphenyl sulphone and 4 - dibromacetylamino-4'-butyrylaminodiphenyl sulphone*

Instead of using 4-amino-4'-acetylaminodiphenyl sulphone, as described in Example 5, an equivalent amount of 4-amino-4'-propionylaminodiphenyl sulphone for 4-amino-4'-butyrylaminodiphenyl sulphone may be used to produce respectively 4 - dibromoacetylamino-4'-propionylaminodiphenyl sulphone or 4-dibromoacetylamino-4'-butyrylaminodiphenyl sulphone.

EXAMPLE 7.—*The preparation of 4-dichloroacetylamino-4'-acetylaminodiphenyl sulphone*

Instead of using dibromoacetyl bromide, as outlined in Example 5, an equivalent amount of dichloroacetyl chloride may be used to produce 4-dichloroacetylamino - 4' - acetylaminodiphenyl sulphone.

EXAMPLE 8.—*The preparation of 4-dichloroacetylamino - 4' - propionylaminodiphenyl sulphone and 4-dichloroacetylamino-4'-butyrylaminodiphenyl sulphone*

Instead of using 4-amino-4'-acetylamidodiphenyl sulphone, as outlined in Example 5, an equivalent amount of 4-amino-4'-propionylaminodiphenyl sulphone and 4-amino-4'-butyrylaminodiphenyl sulphone is reacted with the required amount of dichloroacetyl chloride to produce respectively 4-dichloroacetylamino-4'-propionylaminodiphenyl sulphone and 4-dichloroacetylamino-4'-butyrylaminodiphenyl sulphone.

What is claimed is:

1. A compound which is represented by the following formula:

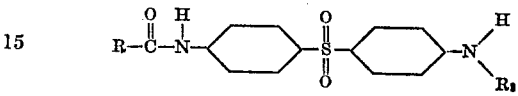

in which

is a member of the class consisting of trichloroacetyl, dichloroacetyl, tribromoacetyl, and dibromoacetyl radicals, and $R_3$ is a member of the class consisting of acetyl, propionyl, and butyryl radicals.

2. 4-Trichloroacetylamino-4' - acetylaminodiphenyl sulphone.

3. 4-Trichloroacetylamino-4'-propionylaminodiphenyl sulphone.

4. 4-Dichloroacetylamino - 4' - acetylaminodiphenyl sulphone.

HORACE A. SHONLE.
ARTHUR M. VAN ARENDONK.